Nov. 9, 1926.  
L. ROUANET  
PLATE SPRING FOR VEHICLES  
Filed Jan. 14, 1924

INVENTOR
LOUIS ROUANET
BY: Francis E. Boyer
ATTORNEY

Nov. 9, 1926. 1,606,386

L. ROUANET

PLATE SPRING FOR VEHICLES

Filed Jan. 14, 1924 3 Sheets-Sheet 2

INVENTOR
LOUIS ROUANET
BY Francis E. Boyer
ATTORNEY

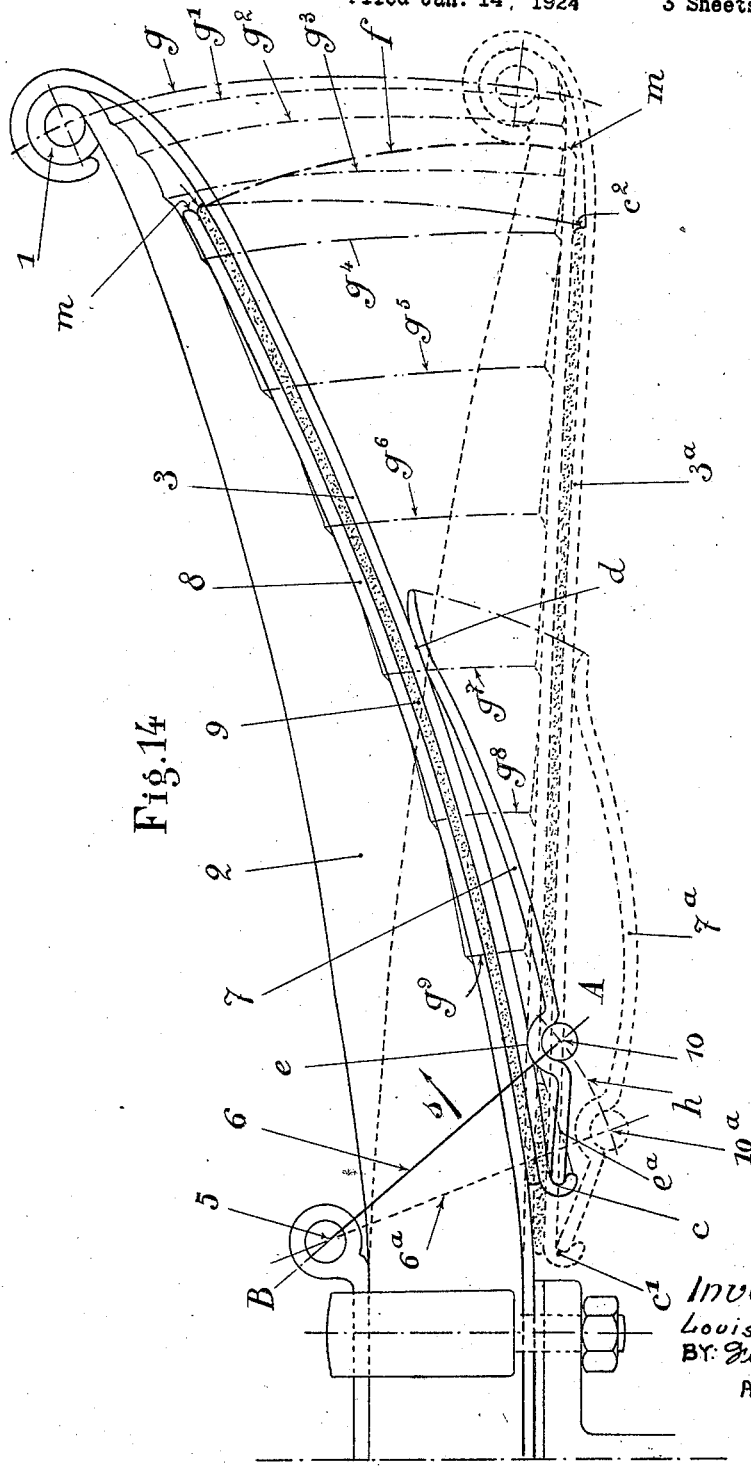

Patented Nov. 9, 1926.

1,606,386

UNITED STATES PATENT OFFICE.

LOUIS ROUANET, OF IVRY-PORT, FRANCE, ASSIGNOR TO COMPAGNIE D'APPLICATIONS MÉCANIQUES, OF PARIS, FRANCE.

PLATE SPRING FOR VEHICLES.

Application filed January 14, 1924, Serial No. 686,043, and in France January 26, 1923.

The present invention relates to plate springs for vehicles, and has for its object to provide for a rational braking of the oscillations which take place both in the direction of the reaction and in that of the action.

The structure of said spring is such that the braking stress in the direction of the expansion is considerably increased and also from the fact that the most exposed parts are entirely covered, a greater safety in the case of rupture is afforded, and said structure is designed in such manner as to automatically produce:

1. A braking effect of but little importance in the position for normal load, so as to retain the spring in this position and to diminish the oscillations, due to small obstacles, which occur during the normal travel of the vehicle.

2. A braking effect which is practically null when the tension of the spring is at a maximum, so that the elastic limit shall not be changed, and chiefly in order that the return to the position of normal load may take place very rapidly, these conditions being essential for the absorption of consecutive shocks.

3. An energetic braking action at the moment of expansion of the spring beyond its position of normal load, so as to eliminate the rebounding of the suspended part.

4. A very energetic braking action which may go as far as the tight holding when the spring is entirely expanded (i. e. when the plates tend to become separated) for example when the vehicle no longer rests upon the ground.

The said spring which has a great homogeneity is characterized in that the plates are compressed over their whole length between the main plate and a covering plate, flexible or deformable, which is attached to the end of the main plate or to an adjacent plate, on the one hand, and which is connected in an elastic manner with the thick part of the spring, on the other hand; this arrangement ensures an automatic braking of the oscillations which take place in both directions, the braking effect being greater in the position of expansion. This braking effort of the oscillations will be advantageously increased by the addition of an intermediate plate interposed between the spring and the covering plate; this intermediate plate should be attached to the thick part of the spring so that the relative displacement of the two plates in contact shall be very great.

The elastic tension of the covering plate against the spring can be made adjustable, and in this case any known regulating means can be employed. The tension may be predetermined, and in this case, the piece used for this purpose may be mounted by tight friction, for example. This tension can be made relatively small while at the same time maintaining an energetic braking action, by interposing between the covering plate and the intermediate plate, a strip of suitable material having a high coefficient of friction; with this arrangement, the friction of the spring plates on one another and the friction of these plates upon the intermediate plate will be much reduced, and this naturally provides a great flexibility and a better efficiency for the spring. The main work of friction will be confined between the said covering plate and the said intermediate plate.

In the appended drawing which shows diagrammatically, and by way of example, various modifications of a plate spring according to the invention:

Fig. 14 shows the diagram of the working of a spring arranged according to Fig. 4.

Figure 1:
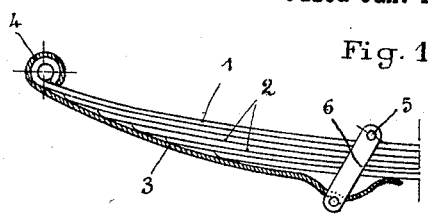
Fig. 1 is a side view of a spring in which the covering plate itself ensures the elastic tension.

In the drawing, 1 is the main plate of the plate spring 2, while 3 is the covering plate which is attached at one end at 4 to the end of the main plate 1 and is connected on the other hand in an elastic manner at 5 with the thick part of the spring, that is to say with the part in which the transverse section comprises the whole number of plates 2. The elastic connection is obtained by a spring clip 6 which is acted upon, at its end farthest from 5, by the end, forming a spring, of the covering plate 3 (Fig. 1).

Figure 2:
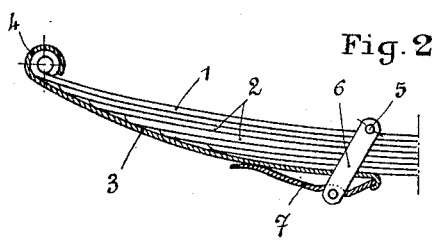
Fig. 2 shows a modification in which the elastic tension of the covering plate against the spring is obtained by means of an independent spring.

In Fig. 2, the covering plate 3 is held pressed in an elastic manner against the spring 2 under the action of an independent spring 7 whose ends bear upon the covering plate 3 and which acts upon the clip 6.

Figure 3:
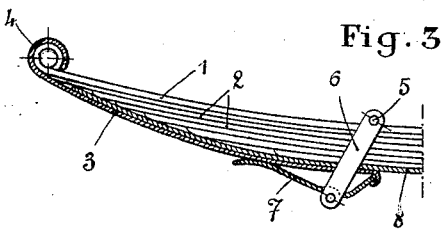
Fig. 3 shows a modification embodying an intermediate plate held on the thick part of the spring.

In Fig. 3, is shown an intermediate plate 8 connected to the thick part of the plate spring 2, the covering plate 3 being attached to the end part of the main plate 1; according to this arrangement, each distortion of the spring will produce a very great friction between the contact surfaces of the plates 8 and 3.

Figure 4:
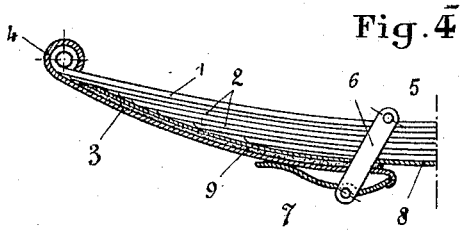
Fig. 4 is a view analogous to Fig. 3 with the addition of a strip made of a substance having a high coefficient of friction.

In Fig. 4, a strip made of any suitable material 9 having a high coefficient of friction is disposed between the two friction surfaces 8 and 3, this disposition allows of reducing to a great extent the degree of elastic tension, the spring is more flexible since the friction is reduced between the different plates of the spring, on the one hand, and between the plates of the spring and the intermediate plate, on the other hand. The working of the spring is perfect; the plates 2 which are slightly pressed will move readily, sliding upon one another, but on the contrary, and although they are subjected to the effect of the same elastic tension, the two plates 8 and 3 between which the braking action chiefly takes place, will slide with difficulty upon one another, and their relative movement is very great. These plates 8 and 3 always remain in close contact, so that the substance placed between them prevents all gripping in spite of the great friction obtained. The whole of this arrangement provides a very homogeneous device which is sufficient in itself to fulfill all desired functions during the work, and the wear or weather conditions cannot cause the same to get out of adjustment.

Figure 5:
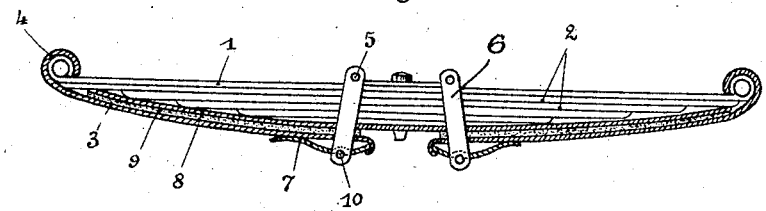
Figs. 5 to 7 show a complete semi-elliptical spring according to the invention, respectively in the position of maximum load, in the position of normal load, and in the position of maximum expansion.
Figure 6:
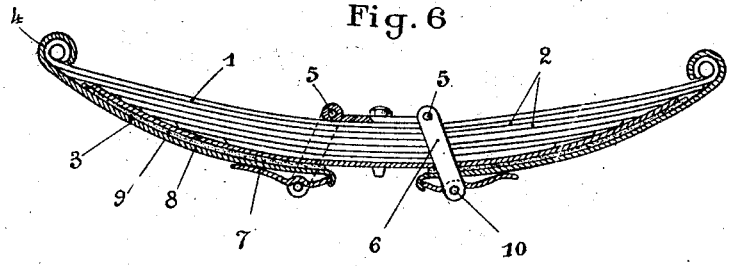
Figure 7:
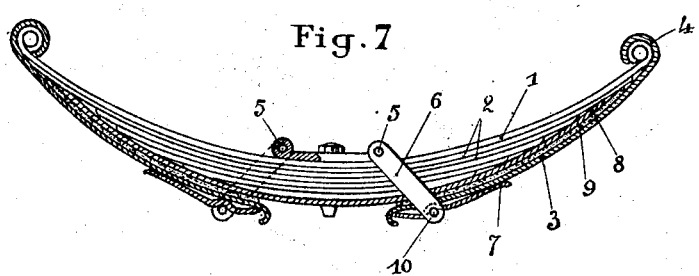

In Figs. 5 to 7 which show the construction of the device illustrated in Fig. 4 for a semi-elliptical spring, it is clearly observed that the angular displacement, towards each end of the main plate 1 of the plate spring 2, of the ends of the clips 6 farthest from the ends pivoted at 5 to the thick part of the spring, tends to bend the spring 7 thus causing an increase of the elastic tension of the covering plate 3. The joint 5 of each clip 6 on the thick part of the plate spring, and also the point of contact of each of the said clips with its spring 7, can be so chosen that the effect of the tension shall be practically null at the moment when the spring supports a maximum load so as not to modify the elastic limit of the said spring (see Fig. 5), but shall be small in the position of normal load (see Fig. 6) and shall be energetic at the moment of the expansion, and even holds tightly the parts when the movement of expansion tends to exceed the position of the spring when in the free state (see Fig. 7).

Figure 8:
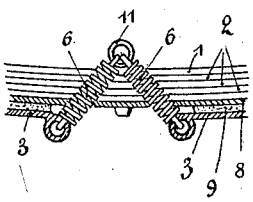
Figs. 8 and 9 show the arrangement with elastic clips pivoting respectively upon the same joint and upon separate joints.

In Fig. 8, the clips 6 are shown in the form of springs, which are pivoted on the one hand to the inner ends of the covering plates 3, and on the other hand to a common piece 11 secured to the upper part of the main plate 1 of a semi-elliptical spring 2, in the middle plane of the latter.

Figure 9:
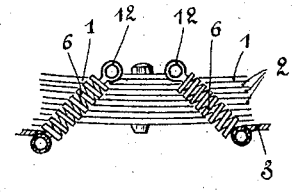

In Fig. 9, the elastic clips 6 are pivoted at two different points 12 to the upper part of the main plate 1.

Figure 10:
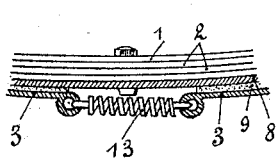
Fig. 10 shows a disposition without joints.

In Fig. 10, the two covering plates 3 of one and the same spring 2, which are elastic, are directly connected together by an elastic connection 13; in this arrangement the clips 6 can be dispensed with.

Figure 11:
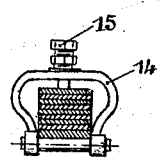
Fig. 11 shows, in front view, an elastic clip.

In Fig. 11 is shown an elastic clip 14 whose tension can be regulated by means of the device 15.

Figure 12:
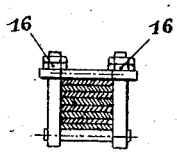
Fig. 12 shows, in front view, an adjustable clip.

In Fig. 12 is shown a clip which is adjustable by means of screws and nuts 16.

Figure 13:
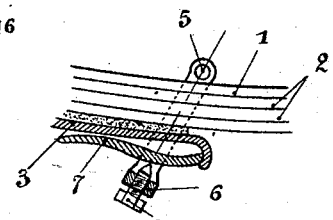
Fig. 13 shows, in longitudinal section, a part of a spring with adjustable clip.

In Fig. 13 is shown a clip 6 pivoted at 5 to the main plate and having at the opposite end a screw 17 by means of which one can adjust at will the tension of the independent spring 7. Since this spring 7 acts directly upon the covering plate 3, the tension of the latter can thus be changed at will.

In Fig. 14 which shows the operating diagram for a spring of the type illustrated in Fig. 4, one has shown in full lines the spring in the position of maximum expansion, in dotted lines the spring in its position under a maximum practical load, and in full and dotted lines the paths followed by the several elements during their movement between these two positions.

In the position of maximum expansion of the spring (position shown in full lines) the plate 8 naturally takes the form of the spring and bears upon the ends of the secondary plates of the latter. The plate 3, whose natural form is that of the position shown at $3^a$, is provided with the strip of suitable substance 9 and covers the plate 8; this plate 3 is attached to the main plate 1 of the spring 2; it is stretched and held upon the plate 8 by the spring 7 which bears at 10 upon the clip 6 pivoting at 5. In this position, the spring 7 is bent to a maximum and it strongly presses the covering plate 3 in the direction A—B of the axis of the clip 6. This pressure of the spring 7 may be decomposed into two forces: one acting at $d$ presses the plate 3 against the plate 8, whilst the other which acts at $c$ urges the plate 3 in the direction of the thick part of the spring, whereby it is caused to suitably cover the plate 8 and to hold the main plate 1, by direct action, at the attaching point of said main plate. This arrangement also causes the main plate 1 to press upon the secondary plates 2 which are thus compressed between the said main plate and the covering plate. The homogeneity of the spring is a maximum in this position, and the safety is also a maximum because the attaching point of the plate 3 is situated at the point of application of the load. The plate spring 2 cannot be further expanded, for the spring 7 touches the covering plate 3 at $e$, thus limiting the motion of the clip 6 in the direction of the arrow $s$.

When the spring is loaded to a maximum, it will have the position shown in dotted lines.

During the movement from one position to the other the end $m$ of the plate 8 has followed the curve $f$, the eye of the main plate 1 has described the curve $g$, the ends of the secondary plates proceeding from the main plate have described respectively the curves $g^1$, $g^2$, $g^3$, $g^4$, $g^5$, $g^6$, $g^7$, $g^8$, $g^9$. The pivot point 10 follows the curve $h$ which has for its centre the point 5. The spring 7 comes to $7^a$. It is observed that the curves $g$, $g^1$, $g^2$ . . . $g^9$ differ but little from one another, and their divergence is due solely to the thickness of each plate; on the contrary, the curve $f$ differs much from the curve $g$, the divergence being due to the whole thickness of the spring at the thick part and to the difference between the initial curvature of the plate 8 and of the main plate 1. The end of the covering plate 3 attached to the main plate 1 will also follow the curve $g$. During the movement, the length whereof is quite considerable and which concerns the whole surface of the plates 8 and 3, the point $c^2$ of the plate 3 moves considerably away from the end $m$ of the plate 8; on the other hand the clip 6 is now at $6^a$, the pivot 10 at $10^a$, the spring 7 at $7^a$; since the curve $h$ described by the pivot 10 of the clip is different from the curve $e^a$ of the plate 3, the spring will be released at $7^a$, and its pressure is a minimum. Since the clip 6 is less inclined, the value of the component exercising traction on the plate 3 is also reduced. So that there will be practically neither friction nor any great resistance to prevent the spring 2 from rapidly leaving this position.

During the return movement to the position of maximum expansion, the pressure and the traction on the plate 3 will gradually increase; the damping of the reaction is obtained near the position for normal load without in any case being able to exceed the position of maximum expansion.

The relative movement between the plate 8 and the secondary plates of the spring will vary for each plate; it is a minimum and almost null for the smallest secondary plate of the spring and a maximum for the longest plate in contact. The average friction between the plate 8 and the points of the secondary plates is of but little importance, and this is favorable, since these parts are not adapted by their construction for a ready assembling and a good contact.

Study of the curves $f$ and $g$ shows that for a given displacement of the main plate the relative slip of the plates 3 and 8 becomes greater when the spring comes near the position of maximum expansion. The traction and the pressure on the covering plate 3, the path moved over by the friction parts, the radius of curvature of the plate 3, the pressure between the spring plates themselves and the pressure between the spring and the intermediate plate 8, will increase simultaneously, and it is the aggregate of all these factors which contributes to the obtainment of a variable braking, whose power increases gradually, and of a suitable acceleration so as to provide for a rational damping of the oscillations, damping which is properly proportioned to each of the positions assumed by the spring.

Having now described my invention, what I claim as new and desire to secure by Letters Patent is:

1. A plate spring comprising a flexible plate for each half spring, said plate covering the secondary plates of the spring, the outer end of each covering plate being connected to the corresponding end of the main plate of the spring, and means for causing the inner end of each covering plate to press yieldingly upon the thick part of the spring.

2. A plate spring comprising an elastic plate for each half spring, said plate covering the secondary plates of the spring, the outer end of each covering plate being connected to the corresponding end of the main plate of the spring and means for causing the inner end of each covering plate to press yieldingly upon the thick part of the spring.

3. A plate spring comprising a flexible plate for each half spring, said plate covering the secondary plates of the spring, the outer end of each covering plate being connected to the corresponding end of the main plate of the spring, and means adapted to urge yieldingly the inner ends of the covering plates upon the thick part of the spring and whereby a yielding pressure is applied upon the secondary plates of the spring while a traction is exerted upon said inner ends of the covering plates.

4. A plate spring comprising a flexible plate for each half spring, said plate covering the secondary plates of the spring, the outer end of each covering plate being connected to the corresponding end of the main plate of the spring and members pivoted about a shaft adapted on the thick part of the spring, said pivoting members being adapted to press yieldingly the inner ends of the covering plates upon the thick part of the spring and to exert a traction upon said inner ends of the covering plates.

5. A plate spring comprising a flexible plate for each half spring, said plate covering the secondary plates of the spring, the outer end of each covering plate being connected to the corresponding end of the main plate of the spring, members pivoted at one end about a shaft adapted on the thick part of the spring and auxiliary springs bearing respectively upon the opposite end of said pivoting members and pressing the inner ends of the covering plates upon said thick part of the spring.

6. A plate spring comprising a flexible plate for each half spring, said plate covering the secondary plates of the spring, the outer end of each covering plate being connected to the corresponding end of the main plate of the spring and the inner end being provided with a stop piece, members pivoted at one end about a shaft adapted on the thick part of the spring and auxiliary springs bearing respectively upon the opposite end of said pivoting members and pressing the inner ends of the covering plates upon said thick part of the spring, the inner ends of said auxiliary springs being adapted to meet respectively said stop pieces.

7. A plate spring comprising a flexible plate for each half spring, said plate covering the secondary plates of the spring, the outer end of each covering plate being connected to the corresponding end of the main plate of the spring and the inner end being provided with a stop piece, members pivoted at one end about a shaft adapted on the thick part of the spring, auxiliary springs bearing respectively upon the opposite ends of said pivoting members and pressing the inner ends of the covering plates upon said thick part of the spring, the inner end of said auxiliary springs being adapted to meet respectively said stop pieces, and means on said pivoting members for adjusting the tension of said auxiliary springs.

8. A plate spring comprising a flexible plate for each half spring, said plate covering the secondary plates of the spring, the outer end of each covering plate being connected to the corresponding end of the main plate of the spring and members pivoted on a piece laid upon the thick part of the spring and secured to the supporting member for said spring together with the spring and through the medium of the same securing means, said pivoting members being adapted to urge the inner ends of the covering plates in an elastic manner upon said thick part of the spring.

9. A plate spring comprising a flexible plate for each half spring, said plate covering the secondary plates of the spring, the outer end of each covering plate being connected to the corresponding end of the main plate of the spring, an intermediate plate disposed between the covering plates and the secondary plates of the spring and connected to the thick part of the spring and means adapted to press yieldingly the inner end of each covering plate upon said intermediate plate and to exert a traction upon said inner end of the covering plate.

10. A plate spring comprising a flexible plate for each half spring, said plate covering the secondary plates of the spring, the outer end of each covering plate being connected to the corresponding end of the main plate of the spring, an intermediate plate disposed between the covering plates and the secondary plates of the spring and connected to the thick part of the spring, strips of material having a high coefficient of friction respectively disposed between each covering plate and said intermediate plate and means adapted to press yieldingly the inner end of each covering plate upon said intermediate plate and to exert a traction upon said inner end of the covering plate.

In testimony whereof I have signed my name to this specification.

LOUIS ROUANET.